United States Patent [19]

Peterson

[11] 3,722,598

[45] Mar. 27, 1973

[54] TORSION BAR DRAFT LOAD ADJUSTER

[75] Inventor: Donald E. Peterson, Milwaukee, Wis.

[73] Assignee: Allis-Chalmers Manufacturing Company, Milwaukee, Wis.

[22] Filed: Dec. 24, 1970

[21] Appl. No.: 101,323

[52] U.S. Cl. .................................................. 172/10
[51] Int. Cl. ............................................. A01b 63/112
[58] Field of Search .................... 172/2, 8, 10, 239, 7

[56] References Cited

UNITED STATES PATENTS

| 3,246,702 | 4/1966 | Carlin | 172/10 |
| 3,239,013 | 3/1966 | Hanssmann | 172/10 |
| 3,022,831 | 2/1962 | Hess | 172/7 |

*Primary Examiner*—William B. Penn
*Assistant Examiner*—R. T. Rader
*Attorney*—Arthur L. Nelson, Kenneth C. McKivett and Robert B. Benson

[57] ABSTRACT

A draft load sensing mechanism for a vehicle having a torsion bar with means for presetting the minimum draft load and load range sensed by the draft load sensing mechanism.

6 Claims, 3 Drawing Figures

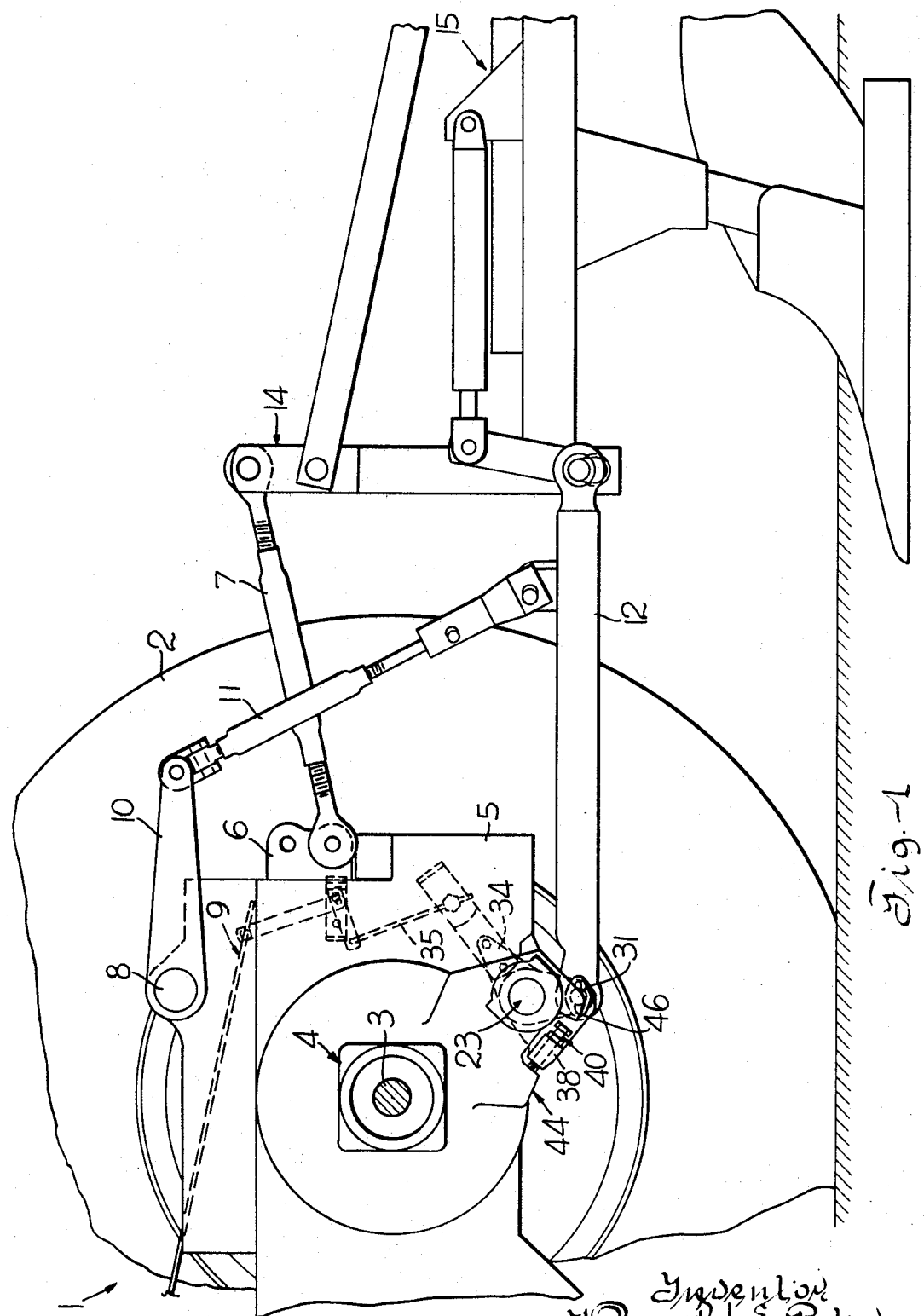

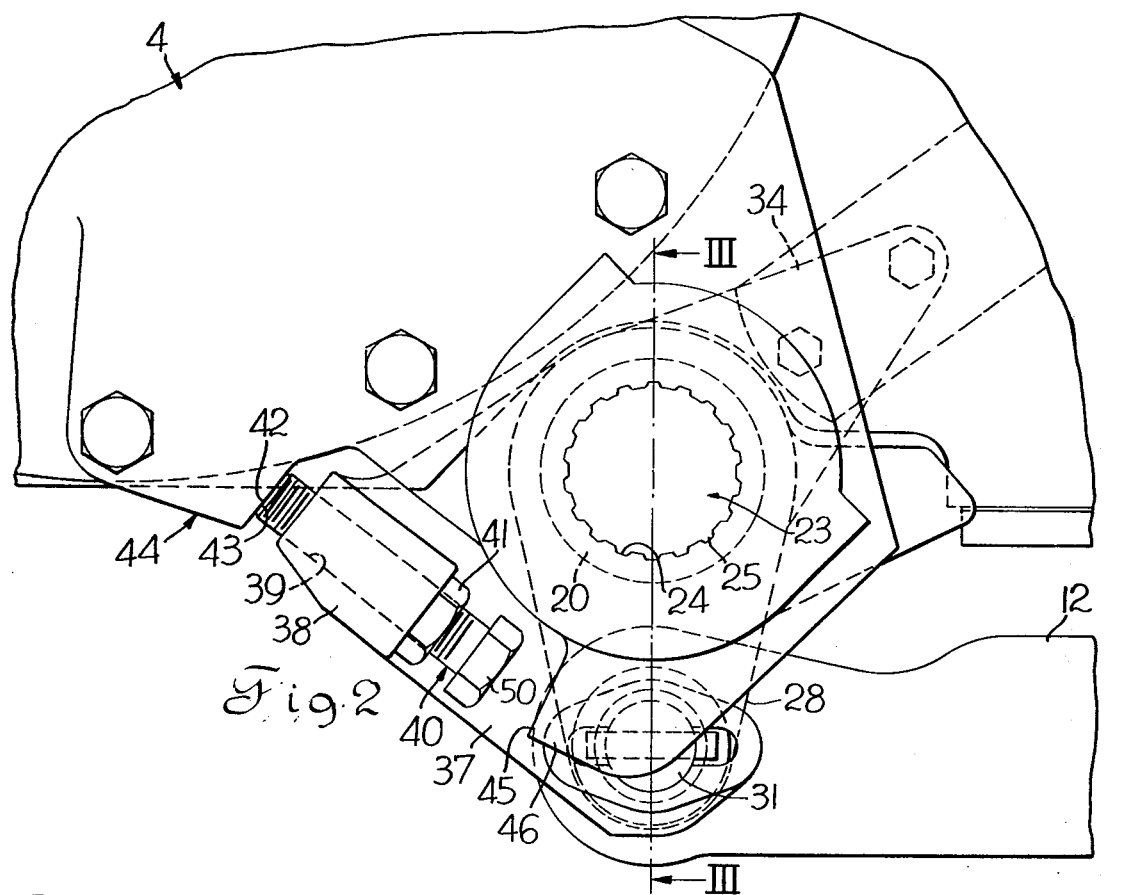
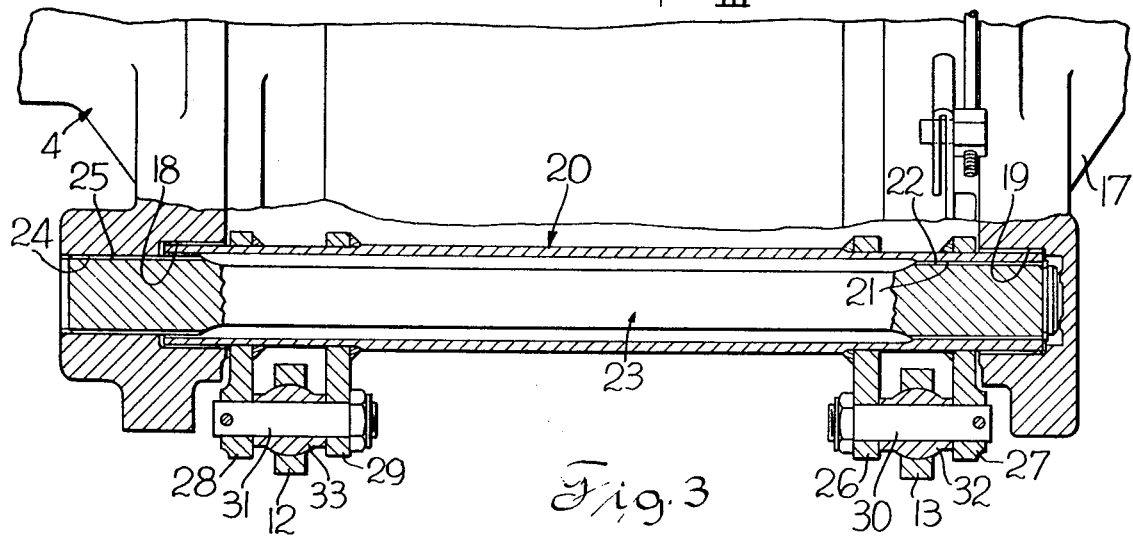

TORSION BAR DRAFT LOAD ADJUSTER

This invention relates to a draft responsive control system for a tractor and more particularly to a torsion bar load sensing device having a preload stop with means to adjust the minimum torque load on the torsion bar and the maximum torque load on the torsion bar which will generate a draft load sensing signal.

A tractor having a weight distribution system is provided with a draft sensing mechanism to initiate a signal in response to a draft load. The signal is transmitted through a linkage to operate a valve in a hydraulic system to either raise the implement in response to an increase in load or lower the implement in response to a decrease in the load sensed. The draft sensing mechanism is provided between the draft arms and the vehicle to sense the draft load and initiate a signal in response to draft load which controls the valve in the hydraulic system for weight distribution of the tractor and implement to thereby provide the proper traction required for the particular load applied to the draft mechanism of the tractor.

The use of a torsion member as the draft sensing member interconnected between the draft arms and the tractor resists forces applied to the draft arms. Such mechanisms are usually preloaded by placing a torque on the torsion bar thereby preventing operation of the sensing means under light draft loads and are also provided with a stop to prevent over stress of the torsion bar when it is subjected to excessive draft loads.

A typical example of the prior art is disclosed in the U.S. Pat. to Carlin No. 3,246,702 which discloses a preloading means consisting of a threaded screw contacting an abuting surface on an arm and a maximum load limit stop which is fixed and limits the maximum torque applied to the torsion bar. It can be seen from the Carlin reference that the preload adjustment also reduces the sensing range or the distance between the stop member and the abuting surface on the arm. In other words, when the preload stress on the torsion bar is increased the range of torsional movement of the torsion bar is decreased. This coupled with the fact that the stop member is a casting and subject to relatively wide manufacturing tolerances meant that the sensing range or the distance between the preload position and the maximum stop was inaccurately controlled.

The present invention contemplated an advance in the art by providing an improved preload and stop means in which the adjusting screw serves the dual function of providing the preload adjustment and also acts as a maximum load stop. An important feature of this improved device is that the preload adjustment has no effect on the load sensing range. A further feature of the invention is that both abuting surfaces for the preload and maximum stop are in a single casting and formed by a single core thereby minimizing manufacturing variations and permitting relatively accurate control of the sensing range.

It is an object of this invention to provide a draft load sensing mechanism having means for setting the preload torque on the torsion bar and the draft load range of the torsion bar.

It is another object of this invention to provide a draft load sensing mechanism including a torsion bar having an adjustable preload and draft load limit stop mechanism for maintaining the range of draft load sensitivity.

It is a further object of this invention to provide a load sensitive mechanism including a torsion bar having a draft load eccentrically applied to the torsion bar with means adjustable preloading minimum draft load for initiating a draft signal and providing a limit stop which determines the maximum draft load providing a draft signal from the draft load sensing mechanism.

The objects of this invention are accomplished by providing a torsion bar which is spline connected to the vehicle chassis and received within a torsion tube which forms a spline mating a spline on the opposite end of the torsion bar. A pair of ears on each end of the torsion tube connects to the lower draft arms which carry the draft load of the vehicle when a load is applied to the draft arm. The torsion bar carries the draft load and the torque applied to the torsion bar causes a stress in the torsion bar in response to the draft load which initiates a signal transmitted through a linkage from the draft sensing mechanism to control a valve in the hydraulic weight distribution system. The torsion tube also carries a flange having a threaded opening to receive a bolt to provide adjustable movement within the threaded opening. The chassis defines a preload abutment and a limit stop in spaced relation to each other on opposite sides of the adjustment screw carried in the flange of the torsion tube. The adjustment screw also carries a lock nut which locks the adjusting screw in a preset position whereby the screw end engages a preload abutment to provide a predetermined torque in the torsion bar which determines the minimum load at which the draft load will initiate a signal. The head of the bolt engages a limit stop which determines the maximum load which will generate a signal in response to an increasing draft load on the draft arms. Accordingly, the end of the screw is adjustably positioned to preset the minimum draft load while the length of the screw determines the load range through which a draft signal is generated. The screw may be of any predetermined length to accomodate the draft range desired.

The preferred embodiments of this invention are illustrated in the attached drawings.

FIG. 1 illustrates the side elevation view of the tractor hitch and implement;

FIG. 2 is an enlarged side elevation view of the draft sensing mechanism with the draft load adjuster;

FIG. 3 is a cross section view taken on line III—III of FIG. 2.

Referring to the drawings the tractor 1 includes a wheel 2 and one of the rear axles 3 in the axle housing 4. The rear drive housing 5 provides a support for the bracket 6 supporting the upper link 7. The rock shaft 8 is operated by a hydraulic actuator in response to a hydraulic valve controlled by the linkage 9. The rock shaft 8 pivots the rock arm 10 to raise the lift links 11 which are positioned on each side of the tractor and connected to draft arms 12 and 13. The upper link 7 is connected to the mast 14 on the implement 15. The lower draft arms 12 and 13 are connected to the lower end of the mast 14.

The rear drive housing 5 supports the left hand rear axle housing 4 and the right hand rear axle housing 17. The left rear axle housing 4 forms a cylindrical opening 18 and the right hand rear axle housing 17 defines a cylindrical opening 19 which journal the torsion tube 20. Torsion tube 20 forms a spline 21 on its internal right hand end which receives the mating spline 22 on the torsion bar 23. The torsion bar 23 extends into a spline 24 in a left hand rear axle housing 4 which is connected to the spline 25 on the left hand end of the torsion bar 23. Accordingly the torsion tube 23 is locked in the left hand rear axle housing 4 and also the right hand end of the torsion bar is locked within the spline on the right hand end of the torsion tube 20.

The ears 26 and 27 are welded to the torsion tube 20 on the right hand end while the ears 28 and 29 are welded to the external periphery of the torsion tube 20 on the left hand side. A pin 30 is received within openings in the ears 26 and 27 while a pin 31 is received within openings on the ears 28 and 29. Pin 30 is embraced by the ball sleeve 32 carrying the draft arm 13 while pin 31 is embraced by the ball sleeve 33 which carries the left hand draft arm 12. The draft load applied to the draft arms 12 and 13 causes the torsion tube to rotate and produce a torque on the torsion bar 23 since the torsion bar is not free to rotate within the housing 4.

Lever 34 is also welded to the torsion tube 20 and is pivotally connected to the link 35 of the linkage 9 which operates the hydraulic valve in the hydraulic weight distribution system. It can be seen that a draft load on the draft arms 12 and 13 will create a stress in the torsion bar 23 which in turn will produce a displacement signal transmitted through the lever 34 to the linkage 9.

The flange 37 is integral with the torsion tube 20. The protrusion 38 forms a threaded opening 39 which threadedly receives the bolt 40. The bolt 40 is locked on the end of the protrusion 38 by the lock nut 41. The end 42 of the bolt 40 engages a surface 43 on the preload abutment 44. The surface 45 on the left hand rear axle housing 4 forms a limit stop 46. Accordingly as the torsion tube 20 rotates the bolt operates between the preload abutment 44 and the limit stop 46 which determines the range of rotational movement responsive to the draft load applied to the draft arms 12 and 13.

The operation of this device will be described in the following paragraphs.

During normal operation it is desirable to prevent operation of the sensing mechanism under light draft load conditions and to also actively prevent overstress of the torsion bar when subjected to excessive draft loads. Accordingly, a preload is applied to the torsion bar 23 by applying a torque to the bar which in turn causes a prestress in the bar. This is accomplished through the cap screw 40 which is tightened against the surface 43 of the preload abutment 44. As the cap screw 40 is advanced in the threaded opening 39 the flange 37 carried on the torsion tube produces a stress in the torsion bar 23. This eliminates any looseness or play of the torsion bar and presets the minimum draft load which must be applied to the draft arms 12 and 13 before the draft signal is initiated by the draft sensing mechanism. The lock nut 41 locks the cap screw 40 in the predetermined adjusted position.

It is also desirable to prevent overstressing of the torsion bar 23 when heavy load is applied to the draft arms 12 and 13. Any excessive load applied directly to the torsion bar 23 may overstress the bar beyond its elastic limit and produce a permanent set in the torsion bar and prevent it from returning to its original position when no draft load is applied to the draft arms 12 and 13. The limit stop 46 defines the surface 45 which engages the head 50 of the cap screw 40. As the head 50 of the cap screw 40 engages the surface 45 the torsion tube 20 is prevented from further rotation about its journaled position in the drive shaft housing. Accordingly any further draft load applied to the draft arms 12 and 13 is ineffective in generating any increase in the displacement signal transmitted through the linkage 9.

It is understood that the distance between the abutting surfaces 43 and 45 is accurately held and is formed on a single member to produce an opening of a predetermined dimension. The length of the cap screw is produced to an exact length and so accurately controls the sensing range of the distance between the head and the abuting surface 42 of the cap screw. If a greater or lesser range is desired a different length of the cap screw may be used to provide the range desired.

It should also be noted that the magnitude of preload has no effect on the sensing range of the torsion bar and the total linkage travel is used for precise positioning of the hydraulic control throughout the draft load range for most effective weight transfer. The preload and maximum load limit stop for the torsion bar is provided on both ends of the bar thereby assuring positive control and effectively eliminating the possibility of failure due to unequal draft loading in the lower draft links.

The embodiments of the invention in which an exclusive property or privilege is claimed are defined as follows:

1. A draft load sensing mechanism for a vehicle comprising a vehicle chassis, a torsion bar connected to said vehicle chassis, a pair of draft arms, draft load transmitting means including a torsion tube with ears extending downwardly for connecting said draft arms to said torsion bar to apply a torque to said torsion bar in response to the draft load on said draft arms, a fixed preload abutment on said chassis, a fixed maximum load limit stop on said chassis disposed at a predetermined dimension from said abutment, a preload torque adjusting means connected to said torsion tube including a screw member of a predetermined shorter dimension than the dimension between said abutment and said stop aligned between said abutment and said stop to define a fixed operating range of said sensing mechanism, said screw member adjustably positioning said preload torque adjusting means to adjustably set the preload torque on said torsion bar while maintaining a constant operating load range for producing a displacement signal from said torsion bar in response to the draft load applied to said draft arms.

2. A draft load sensing mechanism for a vehicle as set forth in claim 1 wherein said torsion tube receives said torsion bar, said preload abutment and load limit stop defined by said chassis positioned in angular spaced relation to each other, said screw member of said preload torque adjusting means connected to said torsion tube being angularly positioned intermediate said abutment and said limit stop, said screw member of said torque load adjusting means thereby engaging said preload abutment to provide a predetermined torsional stress in said torsion bar and for engaging said limit stop to limit the operating load range for said draft load sensing mechanism.

3. A draft load sensing mechanism as set forth in claim 1 wherein said torque adjusting means includes said screw member and a locknut locking said screw member in any adjusted position.

4. A draft load sensing mechanism for a vehicle as set forth in claim 1 wherein said preload torque adjusting means defines a threaded opening in said screw member threadedly engaging said opening in said preload torque adjusting means to thereby provide adjustable means for presetting the preload torque on said torsion bar by engaging said preload abutment and limiting the maximum signal from said load sensing mechanism by engaging said limit stop.

5. A draft load sensing mechanism for a vehicle as set forth in claim 1 wherein said torsion tube defines an internal spline, said torsion bar defines a mating spline for reception in said spline of said tube, said torsion tube thereby applying a torsional stress to said torsion bar in response to draft load.

6. A draft load sensing mechanism for a vehicle as set forth in claim 1 wherein said torsion tube includes a lever integral with said torsion tube adapted for transmitting a signal to a hydraulic weigh distribution system.

* * * * *